United States Patent [19]

Chatterjee et al.

[11] Patent Number: 4,583,285

[45] Date of Patent: Apr. 22, 1986

[54] METHOD OF MAKING SELF-SUPPORTING ELECTRODE FOR SEA-WATER BATTERIES

[75] Inventors: Bivabasu Chatterjee, Chessington; Frank G. Wilson, Guildford, both of England

[73] Assignee: Engelhard Corporation, Menlo Park, N.J.

[21] Appl. No.: 700,166

[22] Filed: Feb. 11, 1985

[30] Foreign Application Priority Data

Feb. 15, 1984 [GB] United Kingdom ................ 8404001

[51] Int. Cl.4 ............................................. H01M 6/00
[52] U.S. Cl. ................................... 29/623.5; 29/623.1
[58] Field of Search ............... 429/119, 118, 219, 220; 29/623.1, 623.5, 730, 730.1

[56] References Cited

U.S. PATENT DOCUMENTS 3,343,988 9/1967 Friend, Jr. ........................ 429/119
4,368,167 1/1983 Berchielli ...................... 429/119 X

FOREIGN PATENT DOCUMENTS 946504 11/1961 United Kingdom .
1065529 4/1967 United Kingdom .
1215627 12/1970 United Kingdom .

OTHER PUBLICATIONS

*Precious Metal Plating*, Johannes Fischer and Dennis E. Weimer, Robert Draper Ltd. (1964) pp. 93–94.

Primary Examiner—Charles F. LeFevour
Attorney, Agent, or Firm—Inez L. Moselle

[57] ABSTRACT

A process for manufacturing a cathode for a sea-water battery by forming a particulate mixture of silver chloride and a substitute therefor.

11 Claims, No Drawings

METHOD OF MAKING SELF-SUPPORTING ELECTRODE FOR SEA-WATER BATTERIES

This invention relates to the manufacture of positive electrodes (cathodes) containing silver chloride mixtures for use as electrochemically active materials in sea-water batteries.

A typical well-known form of sea-water battery comprises a positive plate of an insoluble compound such as silver chloride and a negative plate of magnesium and/or aluminium. The battery is activated when immersed in the sea water. Such batteries are designed for limited life in marine environments and are normally disposed of after use. It has long been appreciated that the high cost of silver chloride makes such disposable batteries expensive, and various attempts have been made to reduce its use. Several suggestions have been proposed in the literature for substituting part or all of the silver chloride with materials such as copper salts, e.g. cuprous chloride, which themselves act as cathodes in the environment described. Silver chloride/cuprous chloride cathodes are described in, for example, U.S. Pat. No. 3,343,988 and U.S. Pat. No. 4,368,167.

These prior art suggestions do not appear to have met wide commercial success. One possible explanation, at least for cuprous salts, is that the melting route for the cathode manufacture leads to oxidation problems.

We have now devised a solid-state process which avoids the melting-casting route for the production of cathodes based on a particulate mixture of silver chloride and a cathodic substitute therefor. The cathodes have good electrochemical properties and possess surprising plasticity at a temperature close to their melting points so that they can be shaped as desired for use in the battery.

According to the invention we provide a process for manufacturing a cathode for a sea-water battery, which comprises forming a particulate mixture of silver chloride and a substitute therefor which has cathodic properties in sea-water, forming the mixture into a substantially solid mass without melting, and annealing the substantially solid mass by heating to a temperature just below the melting point of the mass.

The substitute for silver chloride can be any compound which is chemically stable at room temperature, which is effectively insoluble in water, and which has an appropriate reduction electrode potential ($E°_{MX/M}$). Preferably, the silver chloride substitute is a compound which has a solubility product ($K_{SP}$) less than $10^{-4}$, and a positive reduction electrode potential. Preferably, the silver chloride substitute has a solubility product less than $10^{-5}$, for example $10^{-10}$ or less, and a positive reduction electrode potential greater than $+0.10$ V, for example $+0.15$ V or more. Examples of suitable compounds are copper and nickel salts such as cuprous chloride, cupric oxide, cupric oxalate, cupric tartrate and nickel citrate. Other materials which may be used (but which are less effective cathode substitutes) are lead chloride ($PbCl_2$) and manganese dioxide.

The particulate mixture is formed into a substantially solid mass by any of the known deformation processes, namely pressing, rolling, extrusion etc. Cold forming powder metallurgical techniques such as cold isostatic pressing, or cold rolling or extrusion of the powder may be used. Hot extrusion or hot pressing (without melting) may also be used.

The proportions of silver chloride and substitute therefor may vary widely depending upon the exact nature of the substitute and the electrochemical properties it is desired to achieve. For example, the silver chloride substitute may constitute from 10 to 90% by weight of the mixture, and preferably from 30 to 90% or more preferably from 50 to 80% by weight of the mixture. One factor which favors the use of higher proportions of silver chloride substitute is the lower cost of the substitute as compared with silver chloride. However, at the same time, most substitutes do not have quite such good electrochemical properties as silver chloride, and large proportions of substitute may also provide a product which is unacceptably brittle.

A further factor which may militate against the use of extremely low or extremely high proportions of silver chloride substitute is that mixtures of such proportions may have melting points (and thus annealing temperatures) which are higher than is desired. However, this will not be of major concern when the silver chloride substitute is cuprous chloride since the melting point of the mass will effectively be the eutectic temperature, i.e. 258° C. over the range 9.3 to 83.5% silver chloride by weight.

The annealing step improves adhesion and achieves a more homogeneous mixture of the substantially solid mass. The annealing temperature depends upon the composition of the particulate mixture and to some extent, on the size of the substantially solid mass. The temperature should be sufficiently close to the melting point to form a deformable mass, but not so high as to cause actual melting. The best temperatures may be obtained by trial and error. Generally, however, we have found that temperatures within about 75° C. of the melting point of the mass are suitable, with temperatures within about 50° C. of the melting point being preferred. Even more preferably, the annealing temperature is between 10° C. and 30° C. below the melting point of the mass. For example, when cuprous chloride is employed as the silver chloride substitute, we have found that an annealing temperature of about 230° C. is especially suitable. Annealing times will generally be between 10 minutes and 5 hours, and are preferably between 30 minutes and 2 hours, for example 1 hour.

If desired, the annealing step may be conducted at pressures above atmospheric pressure, such as from 1 to 200 N/mm². Preferably, a pressure of from 10 to 100 N/mm² is used, and more preferably from 25 to 75 N/mm².

The annealed cathode material is then preferably subjected to hot pressing, or rolling or extrusion at the annealing temperature to form a sheet material. Such sheets may be cut to shape and used as such for cathodes in sea-water batteries. The pressure of silver (from the silver chloride) acts as the current collector and thus avoids the need for a separate current collecting grid.

According to a further aspect of the present invention, there is provided a cathode for a sea-water battery comprising an imtimate mixture of silver chloride and a substitute therefor which has cathodic properties in sea-water, said cathode being provided on its surface with a coating of silver chloride. The coating of silver chloride assists in giving corrosion protection to the cathode. It also provides a low ohmic resistance conducting layer on the surface when the battery is first used, since the silver chloride transforms electrochemically to metallic silver. The latter forms a current conductor for the cathode and provides the battery with a short "come-up" time. The outer coating may be provided by, for example, dipcoating from molten silver chloride or by extrusion of a billet of the substantially solid mass inside a silver chloride sleeve. An alternative method is to extrude the particulate mixture inside a silver chloride sleeve so that the substantially solid mass and silver chloride coating are formed in one operation.

The silver chloride coating, if present, is generally less than 1 mm thick, and preferably from 0.05 to 0.8 mm thick, for example from 0.1 to 0.5 mm thick.

Optionally, the sheets may be plated with an electrical conductor such as silver or copper by, for example, the techniques described in U.S. Pat. No. 3,343,988.

An alternative production route for the cathode sheets involves hot die-pressing of the blended mixture directly to the required thickness. The dip-coating can also be omitted where a corrosion problem is not envisaged e.g. for short term storage of the cathode sheet.

The following Examples illustrate the invention:

EXAMPLE 1

A mixture of 70:30 parts by weight of particulate silver chloride and cuprous chloride (both powder sizes <250 microns) was uniformly blended. The mixture was then formed into a billet in a cold isostatic press at about 420 N/mm$^2$ to achieve 97–99% theoretical density.

The resulting cylinder was dipcoated only for a few seconds in a molten silver chloride bath (at about 490°–500° C.), and then annealed at 230° C. for 1 hour. The cylinder, which initially had a coating of about 0.25 mm, was then subjected to deformation (at 230° C.) to provide a sheet material.

The resultant cathode was assembled in a battery with an aluminium anode and tested in a static electrolyte of 3.5% by weight NaCl solution simulating sea water composition. It had an operating voltage of 0.7 volts, an internal resistance of 9 ohms, and provided a discharge current of 80 mA for about 8 hours. It also had a short "come-up" time.

Satisfactory results were obtained using 50:50 and 30:70 parts by weight of silver chloride-cuprous chloride.

EXAMPLE 2

A blended mixture of 30:70 parts by weight of particulate silver chloride and cuprous chloride was poured into an appropriate shaped die cavity. The material was upset using a pressure of approximately 15.4 N/mm$^2$ and then the die assembly plus material was heated to 230° C. After a minimum soak time the press load was increased to give a pressure of approximately 46.2 N/mm$^2$.

The resulting cathode sheet was trimmed and incorporated into a battery using a magnesium anode and a 3.5 wt% NaCl solution as the electrolyte. It maintained an operating voltage of 1.5 volts at a load of 9 ohms and generated a discharge current of 170 mA for approximately 14 hours. The "come-up" time was less than ten seconds.

EXAMPLE 3

The general procedure of Example 1 was followed using a mixture of 70:30 parts by weight of particulate silver chloride and particulate cupric tartrate in place of the silver chloride/cuprous chloride mixture disclosed therein. When tested in a sea-water battery, the resultant cathode was found to give a performance which was comparable with that obtained from the cathode of Example 1. Similar results were also obtained using cupric oxide, cupric oxalate and nickel citrate as the silver chloride substitute. Somewhat reduced operating voltages and discharge currents were obtained when lead chloride and manganese dioxide were used as the silver chloride substitute.

In all the cases described in this Example, an annealing temperature of 30° C. below the melting point of the mixture was used.

It will be understood that the present invention has been described above purely by way of example, and that numerous variations are possible within the scope of the invention.

We claim:

1. A process for manufacturing a cathode for a sea-water battery, which comprises forming a particulate mixture of silver chloride and a substitute therefor which has cathodic properties in sea-water, forming the mixture into a substantially solid mass without melting, and annealing the substantially solid mass by heating to a temperature just below the melting point of the mass.

2. A process according to claim 1 wherein the substitute is a copper or nickel compound.

3. A process according to claim 2 wherein the substitute is cuprous chloride.

4. A process according to claim 1 wherein the substantially solid mass is formed from the particulate mixture by hot and/or cold deformation.

5. A process according to claim 4 wherein the deformation comprises die pressing, rolling or extrusion.

6. A process according to claim 5 wherein the cold forming comprises cold isostatic pressing or the hot forming comprises hot extrusion or die pressing.

7. A process according to claim 1 wherein the annealed product is hot pressed, rolled or extruded into a sheet material.

8. A process according to claim 1 wherein an outer coating of silver chloride is provided on the substantially solid mass prior to annealing.

9. The process of claim 8 wherein said outer coating of silver chloride is provided by dipcoating from molten silver chloride.

10. The process of claim 8 wherein said outer coating of silver chloride is provided by extrusion of a billet of said substantially solid mass inside a silver chloride sleeve.

11. The process of claim 8 wherein said outer coating of silver chloride is provided by extruding said particulate mixture inside a silver chloride sleeve, whereby said substantially solid mass and said silver chloride coating are formed in one operation.

* * * * *